March 28, 1967  E. KIEFER  3,311,199
HYDRAULIC TELESCOPIC DAMPING DEVICES, PARTICULARLY
FOR MOTOR VEHICLES
Filed Oct. 14, 1965  2 Sheets-Sheet 1
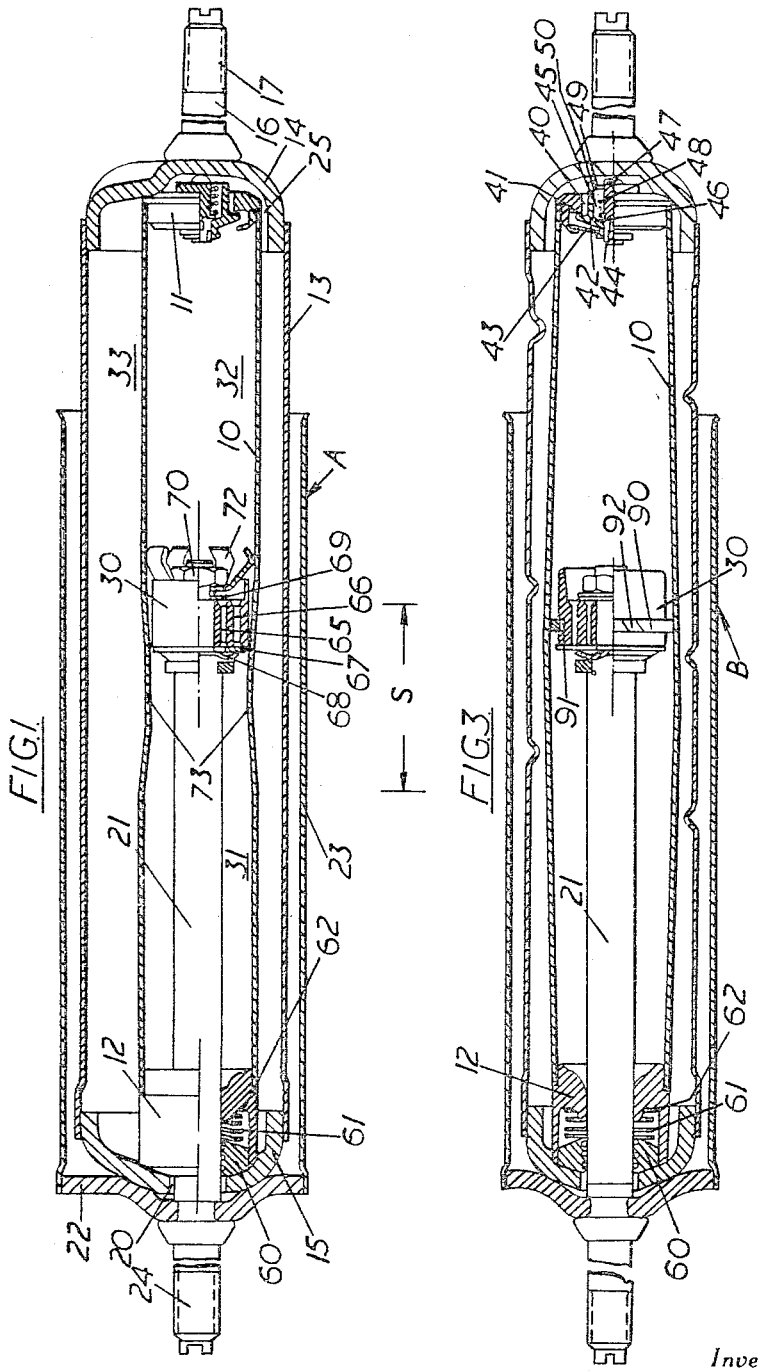
Inventor
EDWIN KIEFER
Attorney March 28, 1967  E. KIEFER  3,311,199
HYDRAULIC TELESCOPIC DAMPING DEVICES, PARTICULARLY
FOR MOTOR VEHICLES
Filed Oct. 14, 1965  2 Sheets-Sheet 2
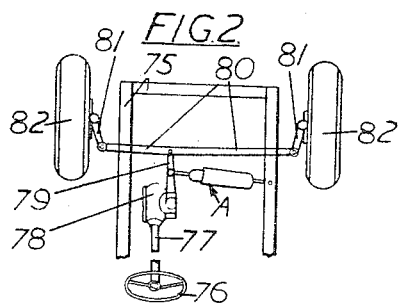
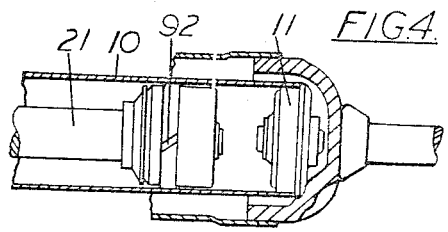
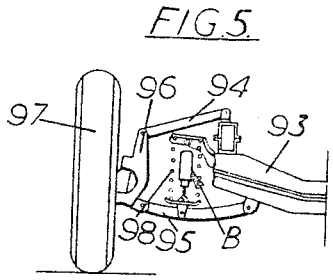
Inventor
EDWIN KIEFER
By
Attorney … # 3,311,199
HYDRAULIC TELESCOPIC DAMPING DEVICES, PARTICULARLY FOR MOTOR VEHICLES Edwin Kiefer, Russelsheim (Main), Germany, assignor to General Motors Corporation, a corporation of Delaware
Filed Oct. 14, 1965, Ser. No. 496,002
Claims priority, application Germany, Oct. 22, 1964, O 10,458
1 Claim. (Cl. 188—88)

This invention relates to hydraulic telescopic damping devices, for example for use in steering linkages and wheel suspension systems of motor vehicles.

The invention is concerned with a hydraulic telescopic damping device which is relatively simple and can be made relatively cheaply by series production, and gives a progressive damping action during its stroke.

In its broadest aspect the invention is a hydraulic telescopic damping device comprising a tube whose inside diameter varies over its length, a damper piston slidable with clearance in the tube, a guide member mounted on the piston and resiliently engaging the interior of the tube, and means for varying the effective flow cross-section between the piston and the tube in dependence on the axial position of the piston in the tube.

When the device is to be used in a motor vehicle steering linkage the inside diameter of the tube within which the damper piston is slidable may diminish from the two ends towards the central portion of the tube, whereas when the device is to be used in a motor vehicle suspension system the inside diameter of the tube may diminish towards the two ends, that is, the tube may be made somewhat barrel-shaped.

In the application of the device to a steering linkage, the relatively small effective flow cross-section and the resulting relatively large resistance to movement in the straight-ahead position of the linkage causes turning impulses due to "shimmy" of the front wheels to be damped to such an extent that they are barely perceptible at the steering wheel. On the other hand, when the steering linkage moves into the cornering position, the damper piston leaves the mid-position and reaches the region of larger tube diameter, whereby, the damping action falls off rapidly. The result is that, at large steering wheel deflections, the device does not increase the steering effort required. Moreover, the self-centering action of the steering system is not impeded, and indeed, upon release of the steering wheel subsequent to cornering, the steering is prevented from passing through the straight-ahead position and then swinging back again. In other words, the damping action of the device remains limited to the mid-position.

In the application of the device to wheel suspension, spring "break-through" at the end of a wheel bump stroke on very uneven terrain can be avoided, whereas within the range of normal spring movements the ride comfort remains unaltered. Again, the highly progressive increase in damping which can be obtained towards the end of a stroke is particularly desirable because it is in the region of the ends of the stroke that the piston speed, and correspondingly the damping, is lowest.

The guide member which is mounted on the piston and resiliently engages the interior of the damper tube serves to guide the damper piston and prevent rattling noises.

According to a preferred and highly advantageous embodiment of the invention, the guide member comprises a piston ring which is accommodated in a circumferential groove formed in the piston and has its outer periphery in resilient engagement with the interior of the tube within which the damper piston is slidable, and, to effect the variation in the effective flow cross-section between the damper piston and the tube, a gap in the piston ring gives an effective flow cross-section which is determined by the internal diameter of the tube at the outer periphery of the piston ring. Thus the piston ring gap increases or diminishes, depending upon whether the damper piston is in a wide or narrow region of the tube. This arrangement permits particularly simple and very accurate adjustment of the damping action.

In the accompanying drawings:

FIGURE 1 is a longitudinal section through one embodiment A of a damping device according to the invention, suitable for a motor vehicle steering system;

FIGURE 2 is a schematic illustration of how the damping device shown in FIGURE 1 may be installed in a motor vehicle steering system;

FIGURE 3 is a longitudinal section through a second embodiment B of a damping device according to the invention, suitable for a motor vehicle wheel suspension system;

FIGURE 4 is a longitudinal section corresponding to the right-hand portion of FIGURE 3, but with the damper piston shown in a position different from that in FIGURE 3; and FIGURE 5 is a schematic illustration of how the damping device shown in FIGURES 3 and 4 may be installed in a wheel suspension system for a motor vehicle.

In both the embodiments A and B, the damping device comprises a tube 10 at one end of which a base valve 11 is mounted, the other end being closed by a closure member 12.

The tube 10 is surrounded by an outer tube 13 to the respective end portions of which caps 14 and 15 are welded. A rod 16 having a threaded attachment portion 17 is welded to the cap 14, and a hole 20 in the cap 15 slidably accommodates a piston rod 21. An annular disc 22 is secured to the piston rod 21, and has one end of a protective tube 23, forming a stone guard, welded to its periphery. At the outer end of the piston rod 21 there is a threaded attachment portion 24, and to the inner end of the piston rod 21 there is secured a damper piston 30 which divides the inner space of the damping device into chambers 31 and 32.

By means of the base valve 11 and adjacent passages 25, the chamber 32 is in communication with a compensation chamber 33 which is formed between the outer tube 13 and the tube 10, and constitutes a hydraulic reservoir.

As shown in FIGURE 3, the base valve 11 has a central aperture 40 having an annular seating face 41 for an inlet valve 42 which is resiliently biased against the seating face 41 by an inwardly extending finger spring 43. The inlet valve 42 has two concentric bores 44 and 45 having different diameters, and between the bores 44 and 45 a conical seating surface 46. A valve 47 is guided in an axially displaceable manner in the narrower bore 44. A helical compression spring 48 has one end seated against the valve 47 for biasing the valve against the conical seating surface 46, and its other end seated against an annular member 49 which is held in a groove 50 of the inlet valve 42. If the damper piston 30 moves towards the base valve 11, the valve 42 is lifted from its seating surface 46 in opposition to the bias of the spring 48, with the result that fluid displaced by the piston rod 21 can flow out of the chamber 32 into the compensation chamber 33. Conversely, if the damper piston 30 moves away from the base valve 11, the inlet valve 42 is lifted from its seating face 41 in opposition to the bias of the spring 43, so that fluid flows back from the compensation chamber 33 into the chamber 32.

For sealing off the damping device, a packing seal 60 is biased against the cap 15 by a spring 61 which is seated in an annular groove 62 in the closure member.

The damper piston 30 has two rings of throttle passages 65 and 66 distributed uniformly round its periphery. The outer ring of throttle passages 66 is controlled by a spring plate 67 which is biased by a spring 68, and the inner ring of throttle passages 65 is controlled by a spring plate 69. The various parts are attached to the piston rod 21 by means of a nut 70.

In the embodiment A which is shown in FIGURE 1, a guide member for guiding the piston 30 in the tube 10 is constituted by a claw member 72 which resiliently engages the interior of the tube. The inside diameter of the tube 10 diminishes from the two ends towards the central portion of the tube; thus, at the middle of the piston movement, the tube 10 has a narrow portion, designated 73. The result of this construction is that the damping action of the device is confined to a middle region, designated S; outside this region, the damper fluid can pass round the outside of the damper piston 30.

FIGURE 2 shows how the damping device A can be arranged in a motor vehicle steering system. 75 denotes the front end of the frame of a motor vehicle. 76 is the steering wheel, 77 the steering column and 78 the steering gear, from which steering movements are transmitted via a steering arm 79 to a track rod 80, and from the opposite ends of the latter by way of respective steering levers 81 for the stub axles (not shown) and thereby to the wheels 82. The damping device A is arranged substantially horizontally between a fixed part of the vehicle, namely the frame 75, and a movable part of the steering linkage, namely the steering arm 79. On account of this horizontal arrangement, in the embodiment shown in FIGURE 1 the tube 10 is disposed eccentrically with respect to the outer tube 13. For the same reason, the passages 25 are placed low. The device is so installed that the tube 10 is as low as possible (as is shown in FIGURE 1), to ensure an adequate fluid level above the base valve 11 at all times. This configuration of the steering system gives the advantage that, when the vehicle is traveling straight ahead, shimmy-inducing impacts are effectively damped, whereas throughout a substantial range of off-centre steering positions the steering effort is not increased by the device, because the damping effects are negligible.

In the embodiment B shown in FIGURE 3, a guide member for guiding the damper piston 30 in the tube 10 is constituted by a piston ring 90 which is accommodated in a groove 91 in the damper piston and has its outer periphery in resilient engagement with the interior of the tube 10. The inside diameter of the tube 10 diminishes towards the two ends of the tube, and, to effect the variation in the effective flow cross-section between the damper piston 30 and the tube 10, a gap 92 in the piston ring 90 can be partially closed by compression of the piston ring as the damper piston 30 slides towards its extreme positions, such that the gap 92 gives an effective flow cross-section which is determined by the internal diameter of the tube 10 at the outer periphery of the piston ring 90.

The resulting increased flow resistance causes an increase in the damping action, so that spring breakthrough movements are damped especially strongly. The increase in the damping action at the end of the stroke is also desirable to compensate for the low piston speeds near the ends of the stroke, since damping would otherwise be low at these low piston speeds.

FIGURE 4 illustrates the reduced piston ring gap 92 when the damper piston reaches the end of its stroke. In the central portion of the stroke, specifically in the operating range with the vehicle at tare or moderate design loading, the piston ring gap 92 is so great that there is scarcely any damping effect. Thus within the normal operating range, better ride comfort is attained.

The tube 10 may be produced by pressure shaping or by explosive forming.

FIGURE 5 shows how the damping device B can be installed in a front wheel suspension. Upper and lower links 94 and 95 are pivotally mounted on a vehicle frame or sub-frame 93, with their outer ends pivotally connected to a steering knuckle 96 to which in turn the wheel 97 is pivotally attached. A helical compression spring 98 is interposed between the frame 93 and the lower link 95. The damping device B is positioned inside the helical spring 98, with one of its ends pivotally connected to the frame 93 and its other end pivotally connected to the lower link 95.

What I claim as my invention and desire to secure by Letters Patent of the United States is:

A hydraulic shock absorber comprising an outer reservoir tube, closure means for sealing ends of said reservoir tube, a second tube located interiorly of said reservoir tube and extending throughout the length of said reservoir tube, said second tube having a varying cross-sectional area diminishing from the center thereof toward either end of said tube, piston means relatively reciprocal in said second tube including centering means thereon for slidably centering said piston means during travel thereof throughout the total length of said second tube, said centering means including means for bleeding fluid from one side of said piston means to an opposite side thereof during travel of said piston means in said second tube proportionally to the cross-sectional area of said second tube at the point said piston means is traveling with respect to said second tube, said bleed means including a split ring of resilient material having a gap therein acting as a variable orifice for diminishing fluid flow across said split ring as said piston means traverses a relatively narrower diameter portion of said second tube and which provides a larger variable bleed orifice as said piston means traverses a relatively larger diameter portion of said second tube.

References Cited by the Examiner

UNITED STATES PATENTS

| 111,418 | 1/1871 | Arnold. | |
|---|---|---|---|
| 2,206,110 | 9/1940 | Myers et al. | 188—88 |
| 2,991,390 | 7/1961 | Shrader | 308—4 X |
| 3,046,062 | 7/1962 | Wettstein | 308—4 |
| 3,062,331 | 11/1962 | Wyman | 188—88 |
| 3,110,367 | 11/1963 | Roberts | 188—96 |

FOREIGN PATENTS

| 1,056,323 | 10/1953 | France. |
|---|---|---|
| 1,126,952 | 8/1956 | France. |

MILTON BUCHLER, *Primary Examiner.*

G. E. A. HALVOSA, *Assistant Examiner.*